US007168151B2

United States Patent
Niimi et al.

(10) Patent No.: US 7,168,151 B2
(45) Date of Patent: Jan. 30, 2007

(54) METHOD OF MANUFACTURING YOKE OF ROTARY ELECTRIC MACHINE

(75) Inventors: Masami Niimi, Handa (JP); Hideki Ichikawa, Maryville, TN (US); Akifumi Hosoya, Anjo (JP); Masahiro Katoh, Chiryu (JP)

(73) Assignee: Denso Corporation, Kariya (JP)

( * ) Notice: Subject to any disclaimer, the term of this patent is extended or adjusted under 35 U.S.C. 154(b) by 83 days.

(21) Appl. No.: 10/937,317

(22) Filed: Sep. 10, 2004

(65) Prior Publication Data
US 2005/0028350 A1 Feb. 10, 2005

Related U.S. Application Data

(62) Division of application No. 09/950,057, filed on Sep. 12, 2001, now Pat. No. 6,804,874.

(30) Foreign Application Priority Data

Sep. 12, 2000 (JP) ............................. 2000-277074
Oct. 23, 2000 (JP) ............................. 2000-323201
Dec. 26, 2000 (JP) ............................. 2000-394893

(51) Int. Cl.
*H02K 15/00* (2006.01)
*H02K 15/14* (2006.01)
*H02K 15/16* (2006.01)

(52) U.S. Cl. ........................ 29/596; 29/463; 29/510; 29/521; 29/524; 29/525; 29/592; 29/592.1; 29/598; 29/602.1; 310/10; 310/42; 310/89

(58) Field of Classification Search ............... 29/596, 29/463, 510, 521, 524, 525, 592, 592.1, 598, 29/602.1; 310/10, 42, 89
See application file for complete search history.

(56) References Cited

U.S. PATENT DOCUMENTS 4,309,815 A 1/1982 Schmitt et al.

(Continued)

FOREIGN PATENT DOCUMENTS

JP       A-52-20207       2/1977

(Continued)

*Primary Examiner*—A. Dexter Tugbang
*Assistant Examiner*—Tim Phan
(74) *Attorney, Agent, or Firm*—Oliff & Berridge, PLC

(57) ABSTRACT

A method of manufacturing a yoke includes a step of cutting a steel plate into a rectangular sheet having a plurality of first dovetail convexities at one end thereof and a plurality of second dovetail convexities at the other end, a step of rolling the rectangular sheet into a cylinder to fit the first dove tails and the second dove tails to each other and a step of punching border portions of the first dove tails and the second dove tails. The second dovetail convexities are formed to be the same in shape as the first dovetail convexities so that they can fit to the first dovetail convexities. A smooth-faced yoke can be manufacture without using an expensive welder.

9 Claims, 16 Drawing Sheets

U.S. PATENT DOCUMENTS

| | | |
|---|---|---|
| 5,201,111 A | 4/1993 | Prohaska |
| 5,426,337 A | 6/1995 | Kobayashi et al. |
| 5,679,994 A | 10/1997 | Shiga et al. |
| 5,731,646 A | 3/1998 | Heinze et al. |
| 6,058,594 A | 5/2000 | Neumann et al. |
| 6,104,109 A | 8/2000 | Sato |
| 6,152,128 A | 11/2000 | Willey et al. |
| 6,191,516 B1 | 2/2001 | Froehlich et al. |
| 6,461,761 B1 | 10/2002 | Moy et al. |
| 6,594,882 B1 | 7/2003 | Tanida et al. |
| 6,606,779 B2 | 8/2003 | Verbrugge et al. |

FOREIGN PATENT DOCUMENTS

| | | |
|---|---|---|
| JP | A-57-017340 | 1/1982 |
| JP | U-58097957 | 7/1983 |
| JP | A-59-179241 | 10/1984 |
| JP | A-61-210854 | 9/1986 |
| JP | A-64-60247 | 3/1989 |
| JP | 5091700 | 4/1993 |

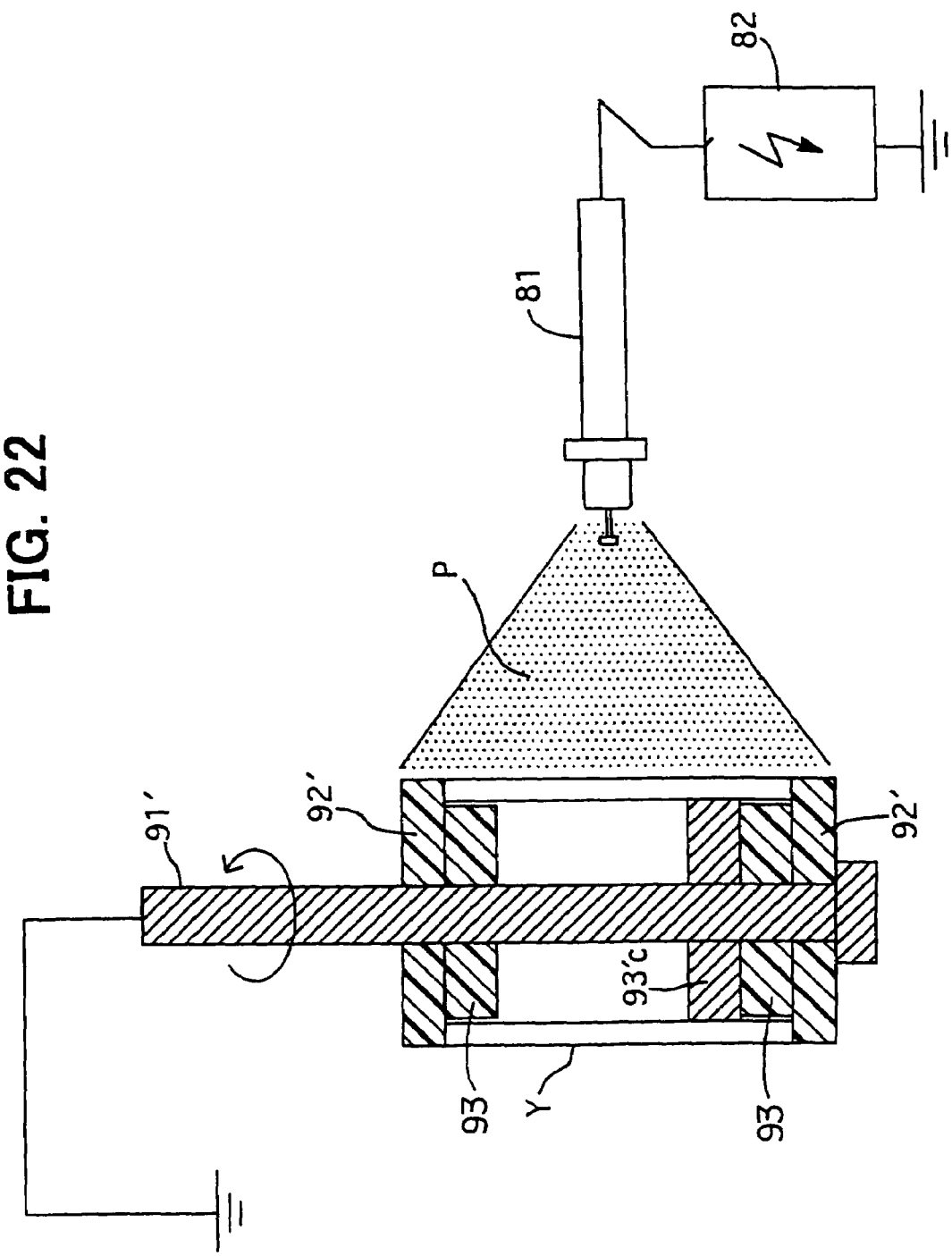

FIG. 25
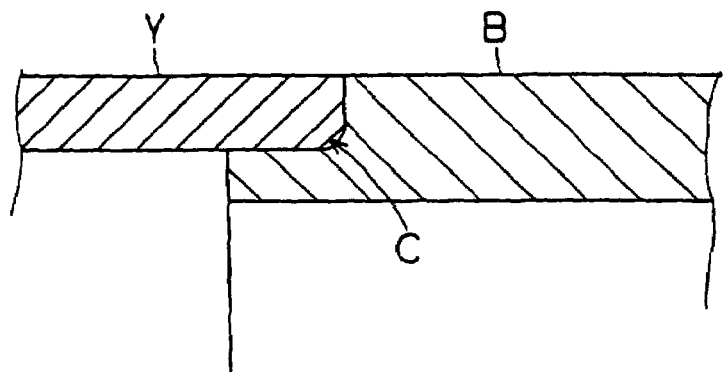
FIG. 26A    FIG. 26B
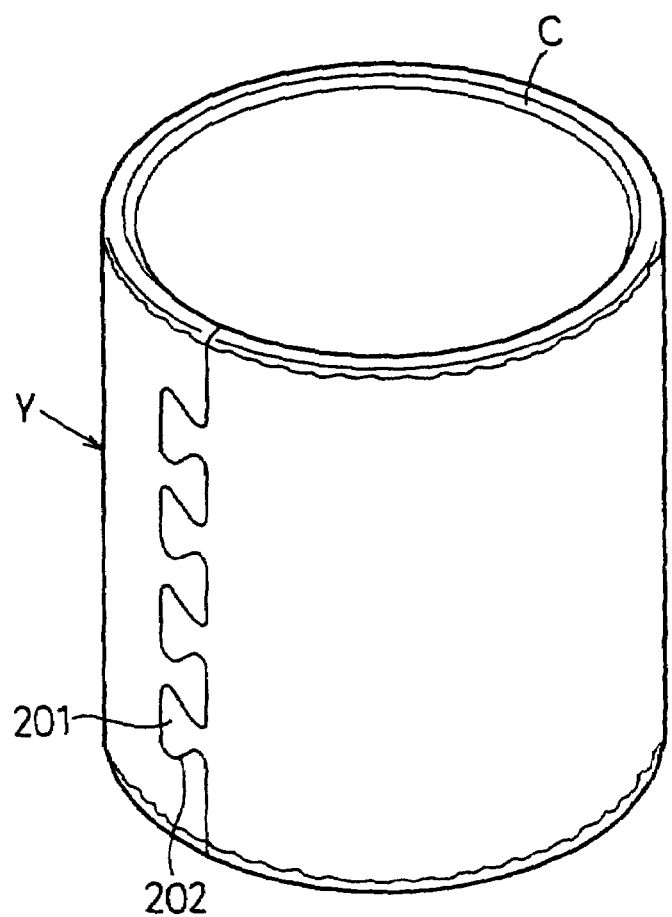
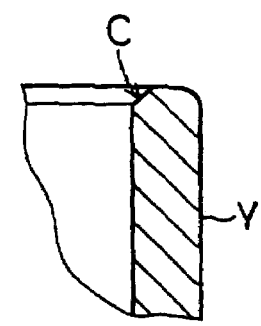

FIG. 27
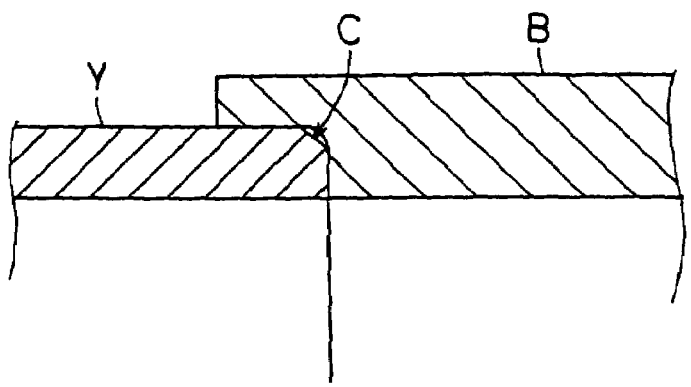
FIG. 28A    FIG. 28B
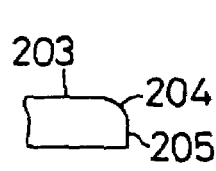 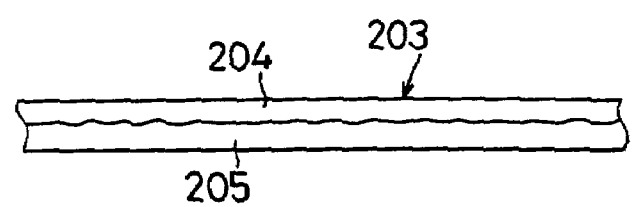
FIG. 29A
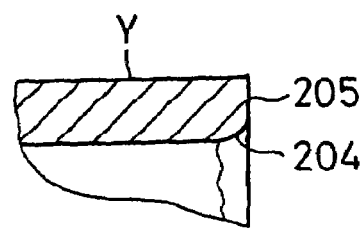
FIG. 29B
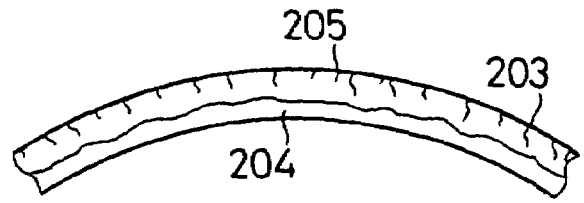

METHOD OF MANUFACTURING YOKE OF ROTARY ELECTRIC MACHINE

CROSS REFERENCE TO RELATED APPLICATION

This is a Division of application Ser. No. 09/950,057 filed Sep. 12, 2001 U.S. Pat. No. 6,804,874. The entire disclosure of the prior application is hereby incorporated by reference herein in its entirety.

The present application is based on and claims priority from the following Japanese Patent Applications: 2000-277074, filed Sep. 12, 2000; 2000-323201, filed Oct. 23, 2000; and 2000-394893, filed Dec. 26, 2000; the contents of which are incorporated herein by reference.

BACKGROUND OF THE INVENTION

1. Field of the Invention

The present invention relates to a method of manufacturing a stator yoke of a rotary electric machine.

2. Description of the Related Art

Japanese Patent application JP-A-64-60247 discloses a method of manufacturing a yoke. In the method, a sheet made of magnetic material, such as iron or steel, is rolled and a number of convexities formed at one side thereof are fitted to the same number of concavities. Thereafter, respective central portions of the convexities of one side of the steel sheet are punched and expanded, thereby clamping the opposite sides of the steel sheet. It is also known that the convexities are shaped into dovetail convexities.

However, because the convexities on a side of a steel sheet are expanded and deformed while the concavities on the other side are not expanded, differences in shape and thickness arise between the one side and the other side. This may cause the circularity of the yoke to be inaccurate. If the circularity is not accurate, it is not possible for a rotary electric machine to provide a small air gap between the rotor and the stator thereof. If the air gap is not made small, the performance of a rotary electric machine lowers.

As a conventional technology of manufacturing a stator yoke of a rotary electric machine, there is a method of manufacturing a yoke disclosed in JP-A-5-91700. In this method, a sheet member is rolled to meet the opposite sides of the sheet member together, and the opposite sides are welded together. For this purpose, positioning concavities are formed on the surface of the sheet member. However, an expensive laser beam has to be used to weld the opposite sides.

It is also known that dovetail convexities are formed at one side of the sheet member, which are fitted and clamped to concavities formed at the other side of the sheet member. In this case, sealant is filled in the clamped portions to ensure the seal, as disclosed in JP-A-52-20207. However, extra steps of filling sealant and removing leftover sealant are necessary, and work time and production cost increase.

Further, a yoke of a motor, such as a starter motor, is manufactured from a steel plate, which is rolled up to form a cylindrical shape so that the opposite sides of the plate are put together and welded to each other as disclosed in JP-U-58-97957 and JP-A-64-60247. There is a chamfered corner at the inside of the yoke in order to have a bracket or the like fitted in the open end of the yoke smoothly.

Such chamfered corner of the yoke is formed by a machine after the steel plate is rolled up. Therefore, the manufacturing cost is high.

SUMMARY OF THE INVENTION

A main object of the present invention is to provide a method of manufacturing a yoke having an accurate circularity.

A main feature of the invention is a step of clamping in which the border portions of both dovetail convexities are punched.

It is only necessary for the first dovetail convexities and the second dovetail convexities to have a wider tail end than a tail base so that it can fit to each other. It is not necessary for them to have a trapezoidal shape. It is not necessary that the step of cutting a steel sheet, the step of fitting the dovetail convexities and the step of clamping the dovetail convexities are separately carried out. Further, it is not necessary that machines for respective steps are separate from each other. It is also possible to integrate such machines so that they can carry out a series of the steps successively.

Because the punches are given along the border of both the first and second dovetail convexities to expand uniformly in the clamping step, both sides of the steel sheet are deformed to the same degree. Therefore, a simple and inexpensive method that is comprised of the step of rolling a steel sheet, the step of meeting the opposite sides thereof together and the step of clamping them can improve the circularity of the yoke. Further, a cylindrical yoke having an accurate circularity can be manufactured from a steel sheet at a comparatively low cost. In addition, the first and second dovetail convexities are respectively formed at almost the whole length of the opposite sides thereof and clamped. Therefore, the fastening strength is increased.

According to another feature of the invention, both the first and second dovetail convexities are the same in size and shape. They are given punches on the border equally, and they are deformed equally so that a very accurate circularity of the yoke can be provided.

According to another feature of the invention, the first and second dovetail convexities are given punches only on the middle border portions where a straight line crosses, and the clamping can be completed by a smallest number of punches. In addition, work time of the clamping can be reduced because the positions on which the punches are given are on a straight line.

Therefore, the manufacturing cost and work time can be reduced.

According to another feature of the invention, punches are given on the middle of the longitudinal borderline to clamp the opposite sides of the rolled steel sheet. Therefore, compressed stress or bending strain does not appear at the axial ends of the borderline, and the opposite sides of the rolled steel sheet are well prevented from separating from each other at the axial ends of the yoke.

According to another feature of the invention, the profile of the first and second dovetail convexities includes a straight portion. Therefore, the steel sheet can be cut easily at a low cost. In other words, since the dies of the press machine includes the corresponding straight portion, the dies can be made at a low cost. Therefore, work time and the cost of production can be reduced.

Another object of the present invention is to provide a simple method of manufacturing a well-sealed yoke at a low cost.

According to a feature of the invention for this object, an outer periphery of a yoke is electro-statically painted in a painting step to seal portions where convexities and concavities are fitted to each other. Since the outer periphery of the yoke is electro-statically painted, small gaps can be sealed by paint. Therefore, a sufficient hermetic seal can be provided. Since the surface of the clamped portion sealed by the electro-static painting is smooth, no step of smoothing the yoke surface is necessary.

According to another feature of the invention, a gap opening to the outer periphery is formed at least the clamped portions. Therefore, electric charge gathers around the gap when the peripheral surface of the yoke is electro-statically painted, and the paint moving to the clamped portion gets into the gap.

Therefore, a very smooth peripheral surface of the yoke can be provided.

According to another feature of the invention, the gap is less than twice as thick as a paint film formed in the painting step, the gap can be sufficiently filled with the paint.

Accordingly, the yield rate of the paint can be improved and the production cost and time can be reduced.

According to another feature of the invention, the yoke is heated before powder paint is sprayed on the peripheral surface, the paint can stick to the peripheral surface very well. Therefore, a beautiful yoke can be provided.

According to another feature of the invention, the starting point of the painting and the ending point of the painting are set at the clamped portion so that the clamped portion can be painted twice. Therefore, the gaps at the clamped portion can be sufficiently filled with paint, and a higher hermetic yoke can be provided without additional cost.

Another object of the invention is to provide a yoke of a rotary electric machine that can eliminate the machine work for the chamfering.

A yoke of a motor is formed from a steel plate that is rolled to form a cylindrical shape having axially opposite ends that are chamfered at inside or outside corners thereof. According to a feature of the invention, the steel plate is chamfered before it is rolled up.

This invention omits additional chamfering machine work. If a member (e.g. a bracket) to be assembled to the yoke is fitted to the inside of the yoke in the axial direction thereof, the inside corner of the yoke is chamfered. On the other hand, the outside corner of the yoke is chamfered if the member is fitted to the outside of the yoke, so that cracking from the shear drop can be prevented.

According to another feature of the invention, the steel plate is cut by a press machine into a strip having a fixed width and rolled so as to locate a shear drop that is formed due to cutting by a press machine at the outside of said cylindrical shape. Accordingly, the cut surface does not expand circumferentially outer direction when the steel plate is rolled up so that cracking can be prevented from extending from the cut surface.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 22 is a schematic cross-sectional diagram illustrating a holder holding the yoke in the painting step according to a variation 1 of the fourth embodiment;

FIG. 25 is a cross-sectional view of a yoke and a bracket fitted together;

FIG. 26A is a perspective view illustrating the whole portion of the yoke shown in FIG. 25, and FIG. 26B is a cross-sectional view illustrating an end of the yoke;

FIG. 27 is a cross-sectional view illustrating the yoke and the bracket fitted together;

FIGS. 28A and 28B are side and front views illustrating the cut surface of the steel plate cut by a press machine; and FIG. 29A is a cross-sectional view of an end of the yoke, and FIG. 29B is a plan view thereof viewed in the axial direction.

DETAILED DESCRIPTION OF THE PREFERRED EMBODIMENTS

Methods of manufacturing a yoke according to various embodiments of the invention are described with reference to the appended drawings.

A method of manufacturing a stator yoke of a starter motor according to a first embodiment of the invention is described hereafter. The method of manufacturing a yoke includes steps of cutting, fitting and clamping.

At the cutting step, a belt like long steel sheet is cut into a rectangular shape having first dovetail convexities 1 on one side thereof and second dovetail convexities 2 on the other side so that they can be fitted to the first dovetail convexities. A press cutter is used to cut the steel sheet in the following manner to have a good yield rate: when the first dovetail convexities 1 are cut at one side, the second dovetail convexities 2 are automatically formed at the other side, as the fragments of the first dovetail convexities.

Figure 1:
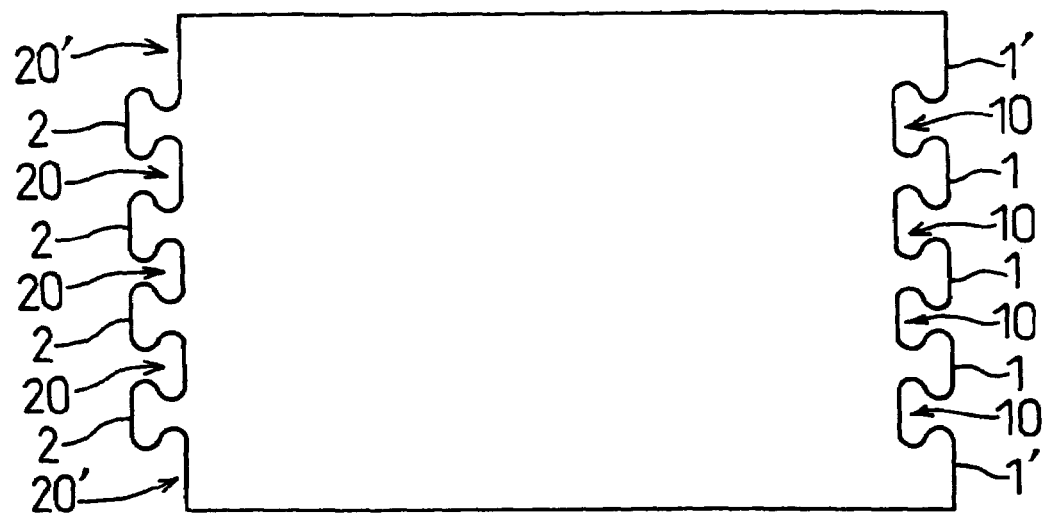
FIG. 1 is a plan view of a cut sheet for a yoke according to a first embodiment of the invention.

As shown in FIG. 1, there are three first dovetail convexities 1 formed at the middle and half-dovetail fragments 1' and straight portions at the opposite axial ends, on one side (right in FIG. 1) of the cut steel sheet. There are four concavities 10 among the three dovetail convexities 1 and two fragments 1'. On the other hand, there are four second dovetail convexities 2 at the middle thereof and incomplete concavities 20' at the opposite axial ends on the other side (left in FIG. 1). There are three concavities 20 among the second dovetail convexities 2.

Three first dovetail convexities 1 on one side and four second dovetail convexities 2 on the other side are the same in shape and formed at axial positions so that they can fit each other. In other words, the first dovetail convexities 1 and incomplete dovetail fragments 1' on one side are located to correspond to the concavities 20 and the incomplete concavities 20' and to fit to the concavities 20 and the incomplete concavities 20'. Similarly, the second dovetail convexities 2 on the other side are located to correspond to the concavities 10 and to fit to the concavities 10.

Figure 2:
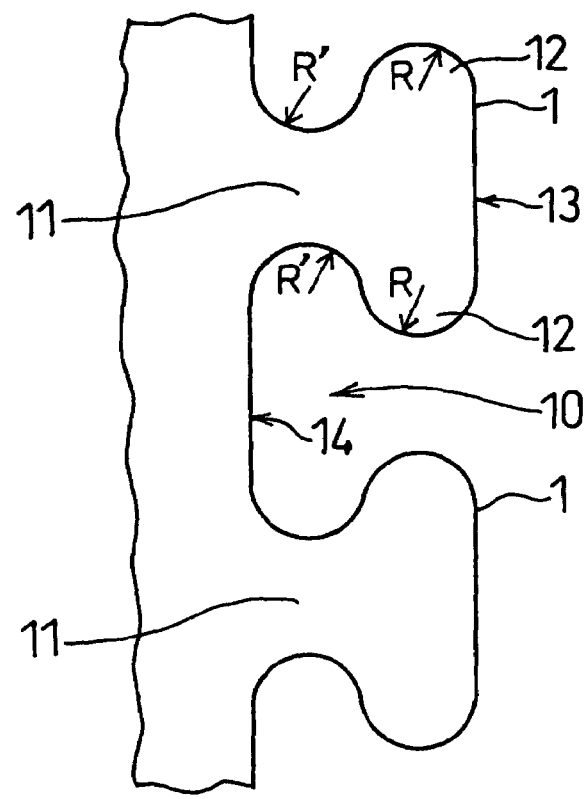
FIG. 2 is a fragmentary enlarged view of first dovetail convexities of the steel sheet shown in FIG. 1.

Each of the first dovetail convexities 1, as shown in FIG. 2, has a semicircular neck 11 at the base thereof and a pair of semicircular ears 12 at the end thereof. The semicircular neck 11 has a radius R' that is approximately the same as or a little smaller than a radius R of the ears 12. The second dovetail convexities 2 are the same in shape as the first dove tails 1 except for projecting direction and the axial position.

Each of the first dovetail convexities 1 has an axially extending straight portion 13 at the end thereof. Straight portions 14 are also formed at concavities 10 between the first dovetail convexities 1 and the half dovetail fragment 1'. Since the second dovetail convexities 2 and the first dovetail convexities 1 are the same in shape, a portion of the first and second dovetail convexities is straight.

Figure 3:
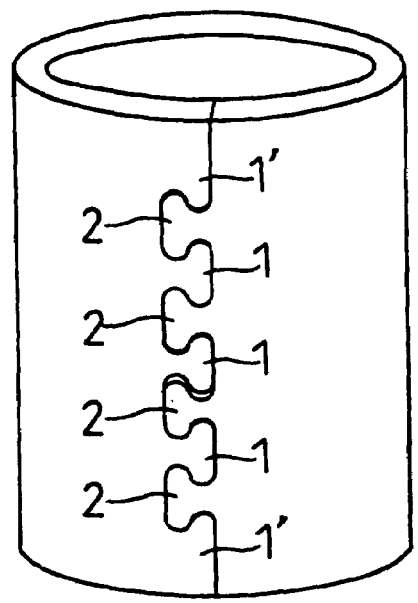
FIG. 3 is a perspective view of a yoke after a fitting step according to the first embodiment.
Figure 4:
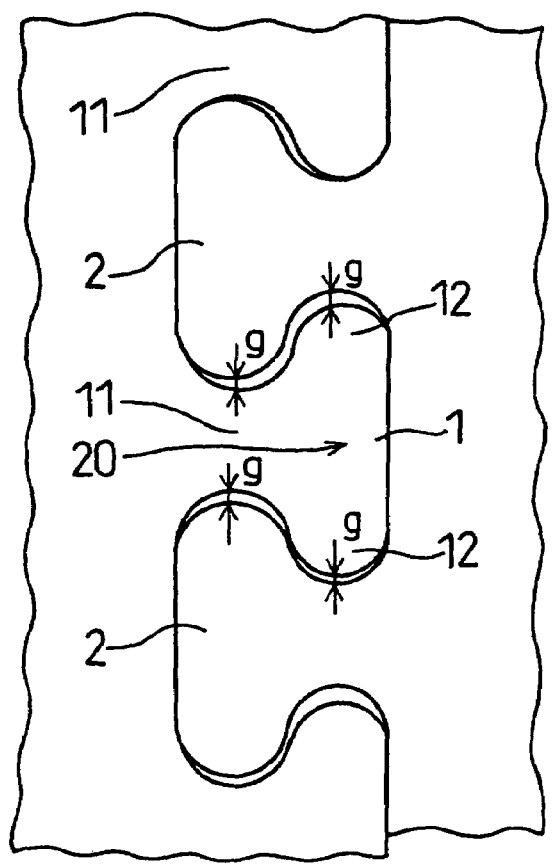
FIG. 4 is an enlarged side view of the dovetail convexities of the yoke shown in FIG. 3 being fitted together.

In the step of cutting, as shown in FIG. 3, the cut steel sheet is rolled to be cylindrical, one side of the steel sheet and the other side are put together to fit the first dovetail convexities and the second dovetail convexities to each other. As shown in FIG. 4, there is a small gap g between each of the first dovetail convexities 1 and the neighboring one of the second dovetail convexities 2, so that the first dovetail convexities 1 and the second dove tails 2 can loose-fit to each other.

Figure 5:
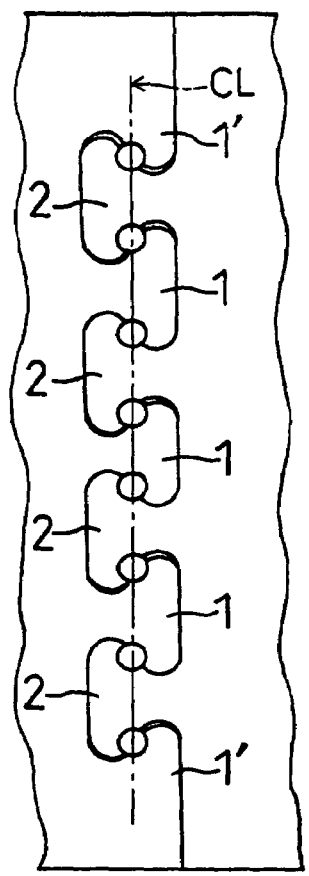
FIG. 5 is a side view of punched portions of the dovetail convexities shown in FIG. 3 in a clamping step.

Finally, in the step of clamping, as shown in FIG. 5, the first dovetail convexities 1 and the second dovetail convexities 2, which are fitted to each other, are punched at borders thereof so that one side of the rolled steel sheet or a yoke Y and the other side thereof can be clamped to each other. In more detail, the first dovetail convexities 1 and the second dovetail convexities 2 are punched at middle portions of the borders located at a center line CL, as shown by circles, so that the one side and the other side of the yoke Y can be clamped to each other.

Figure 6:
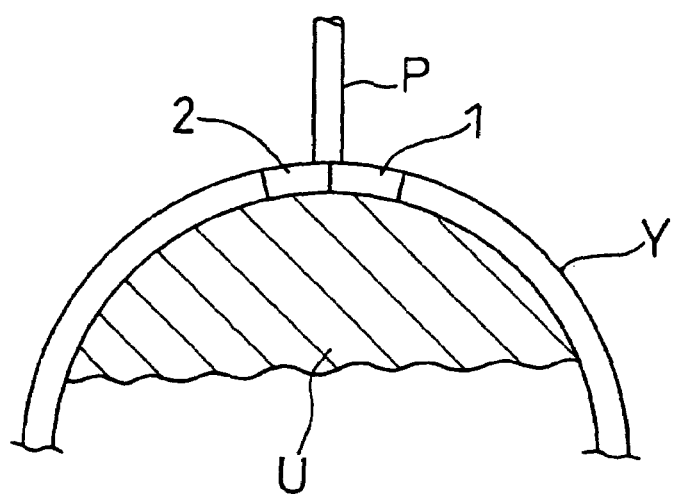
FIG. 6 is a cross-sectional view of a tool used in the clamping step according to the first embodiment.
Figure 7:
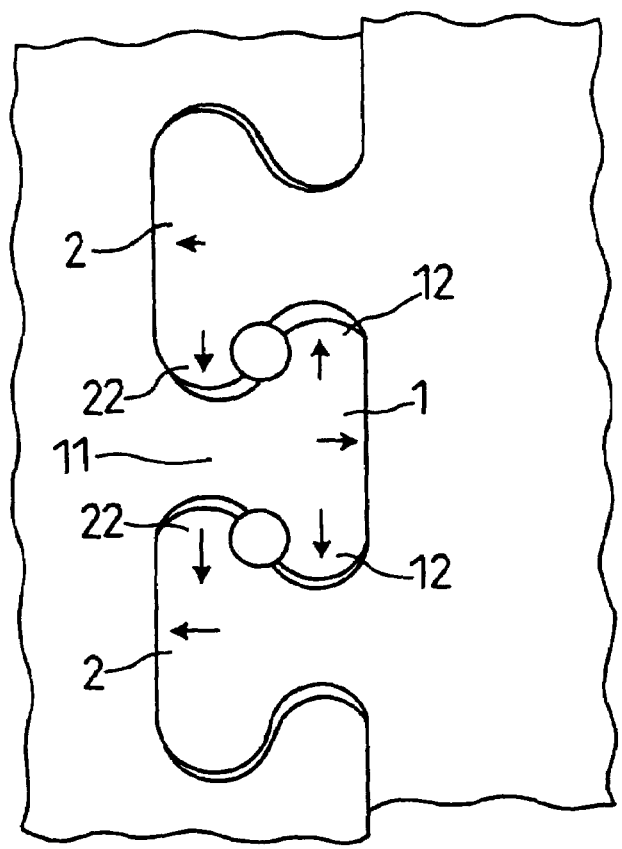
FIG. 7 is a side view of portions around the dovetail convexities for showing a plastic deformation in the clamping step according to the first embodiment.
Figure 8:
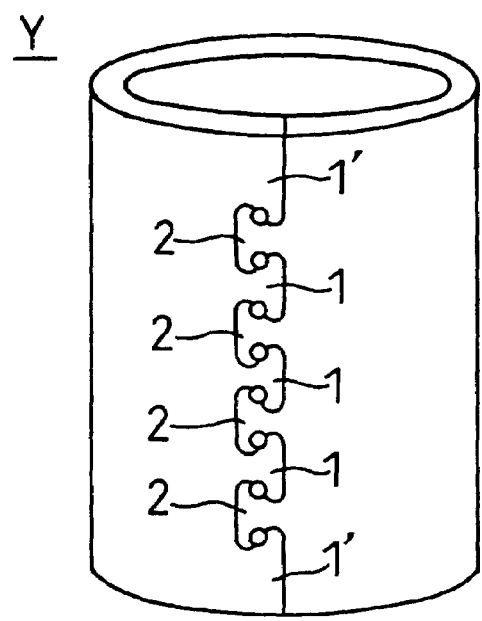
FIG. 8 is a perspective view of the yoke after the clamping step according to the first embodiment.

As shown in FIG. 6, the opposite sides of the steel sheet for the yoke Y are set on a lower die U that has the same outside diameter as the inside diameter of the yoke Y. Then portions of the opposite sides are punched by a cylindrical flat-head punch P from above, so that, as shown in FIG. 7, the first dovetail convexities 1 and the second dovetail convexities 2 plastically deform or flow in the directions indicated by arrows to fill the gaps between the dovetail convexities 1 and 2. Thus, the dovetail convexities 1 and 2 are tightly clamped, and a cylindrical yoke Y is formed from a steel strip as shown in FIG. 8.

Thus the method of manufacturing a yoke according to the first embodiment has the following effects.

When the first dovetail convexities 1 and the incomplete dovetail convexities 1' on one side of the steel sheet are cut out by a press cutter, the second dovetail convexities 2 and the incomplete concavities 20' are automatically formed on the other side. Therefore, the yield rate of the steel sheet becomes higher and the material cost becomes lower; the straight portions 13 and 14 of the first and second dove tails 1 and 2 make the cost of the dies of the press cutter inexpensive.

As shown in FIG. 5, both the dovetail convexities 1 and 2 are the same in shape and are punched at the middle of the borders along the center line CL of both the dovetail convexities 1 and 2. Therefore, both the dovetail convexities 1 and 2 plastically deform uniformly. As a result, a yoke Y can have an accurate circularity.

A small number (e.g. eight) of the punched positions (indicated by circles) is sufficient for the clamping. Therefore, the cost and time for the clamping step is small. Therefore, the method of manufacturing a yoke according to the first embodiment is suitable to mass-production of the yokes.

Because the first dovetail convexities 1 and the second dovetail convexities 2 are clamped after being fitted each other, a great fastening strength can be provided.

Figure 9:
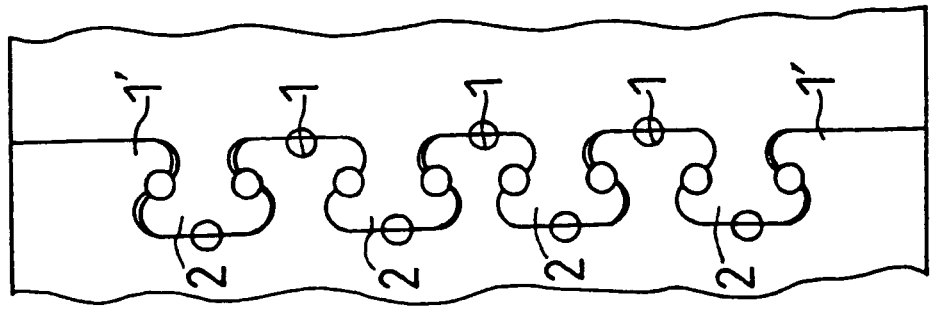
FIG. 9 is a side view of punched portions of the dovetail convexities in a clamping step according to a variation of the first embodiment.

As a variation 1 of the present embodiment, the dovetail convexities 1 and 2 are punched at the edges thereof located on the border line, as shown in FIG. 9. Therefore, the gap g between the first and second dovetail convexities 1 and 2 can be filled and clamped although strength of the punches is smaller. Therefore, a yoke Y that has a higher circularity than the first embodiment can be provided.

Figure 10:
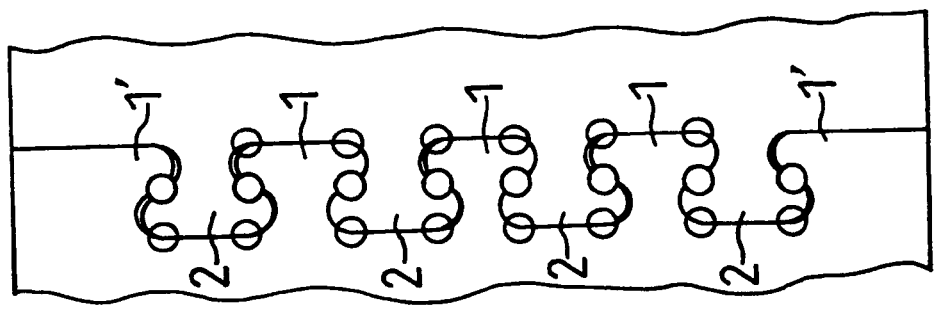
FIG. 10 is a side view of punched portions of the dovetail convexities in a clamping step according to another variation of the first embodiment.

As a variation 2 of the invention, as shown in FIG. 10, punches are given at opposite sides of the edge along the borders of both the dovetail convexities 1 and 2. In this embodiment, the portions at which punches are given are disposed in a lattice shape. Therefore, the clamping device can be made easy. Although the punching force is smaller than that of the first embodiment, the gap g between the first and second dovetail convexities 1 and 2 can be closed and clamped. Therefore, more accurate circularity of the yoke can be provided.

Figure 11:
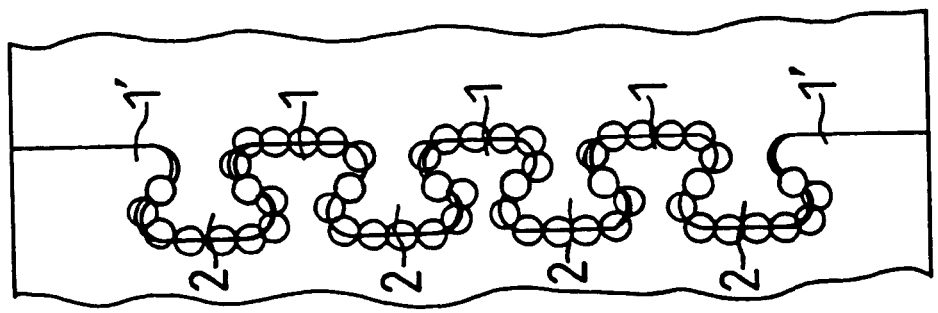
FIG. 11 is a side view of punched portions of the dovetail convexities in a clamping step according to another variation of the first embodiment.

As a variation 3 of this embodiment, both the dovetail convexities 1 and 2 are punched along the border to be clamped, as shown in FIG. 11. Although the punches are not so strong as the first embodiment, the gap g between the first and second dovetail convexities 1 and 2 can be closed and clamped. Therefore, more accurate circularity of the yoke Y can be provided.

In stead of a punch, a roller can be used in the step of clamping,

A method of manufacturing a yoke according to a second embodiment of the invention is described hereafter.

Figure 12:
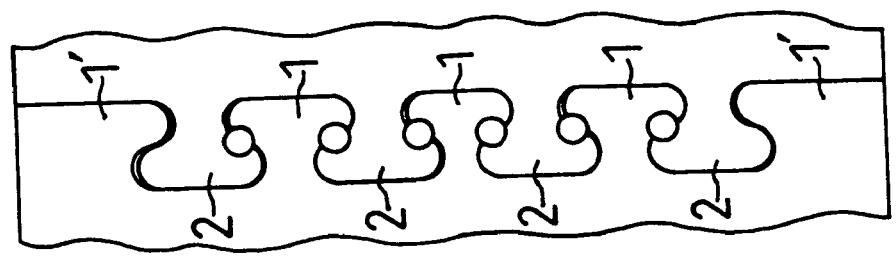
FIG. 12 is a schematic side view typically illustrating a drawback in the clamping step.

If the dovetail convexities 1 and 2 formed near the axial edges are punched, the incomplete dovetail convexities 1' may deform in the axial direction, and a gap G is formed between one and the other sides of the steel sheet at the axial ends of the yoke Y as shown in FIG. 12.

Figure 13:
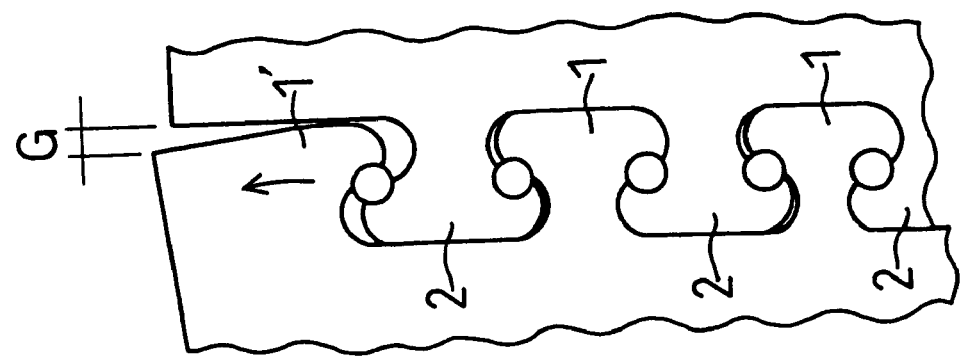
FIG. 13 is a side view of punched portions of the yoke around the dovetail convexities in a clamping step according to a second embodiment of the invention.

In the method according to the second embodiment, the portions at axially opposite ends of the first and second dovetail convexities 1 and 2 are not punched, as shown in FIG. 13. That is, the portion along the border of the incomplete dovetail 1' and the second dovetail 2 is not punched in the clamping step. Others are the same as the embodiment 1.

Therefore, the incomplete dovetail convexities 1' fitted to the dovetail convexities 2 at the axial ends of the yoke Y without deforming, so that the clamped portion is not separated. Further, the number of portions being punched in the clamping step can be reduced from 8 to 6. Although a small gap remains between the incomplete dovetail 1' and the second dove tail 2 at the axially opposite ends of the steel sheet, such gap does not affect magnetic characteristic of the yoke Y.

Figure 14:
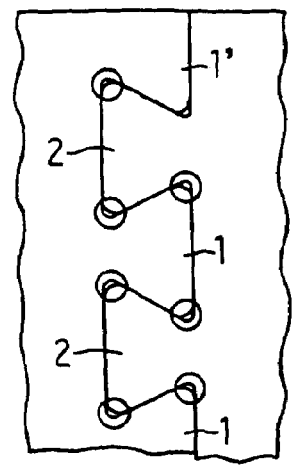
FIG. 14 is an enlarged side view of the yoke by a method according to a third embodiment.
Figure 15:
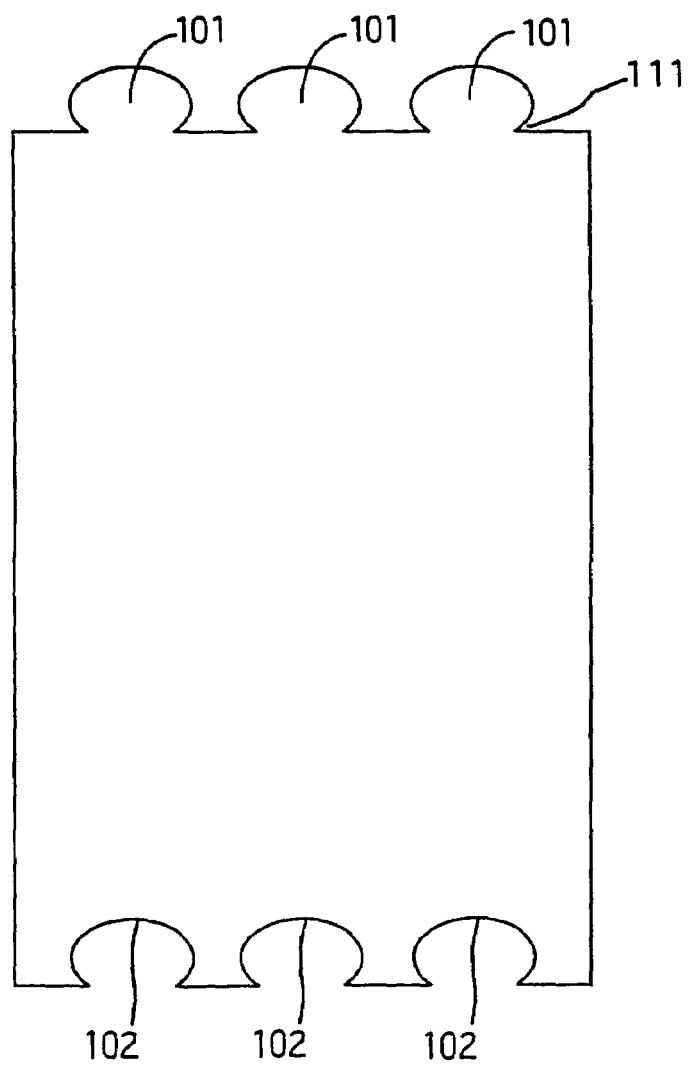
FIG. 15 is a plan view illustrating a cut steel sheet in a cutting step of a method according to a fourth embodiment of the invention.

A third embodiment of the invention is described with reference to FIG. 14. The fitting step is almost the same as the fitting step of the first embodiment.

In the cutting step, inversed trapezoidal first dovetail convexities 1 and the second dove tails 2 are respectively formed on one and the other sides of the steel sheet. Both the dovetail convexities 1 and 2 are the same in shape, and each corner of the dovetail convexities 1 and 2 is chamfered.

In the clamping step, the corners of the dovetail convexities 1 and 2 are punched and clamped. However, the corner of the incomplete dovetail convexities 1' and the corresponding corners of the dovetail 2 are not punched. Therefore, the circularity of the yoke becomes more accurate, the joint strength can be improved.

Since the dovetail convexities 1 and 2 of this embodiment include more straight profile portions than the first embodiment, the press cutter can use less expensive dies.

The shape of the dovetail convexities 1 and 2 can be modified, in the cutting step, to many shapes other than the inversed trapezoid. The punching position can be changed in many ways.

A method of manufacturing a yoke according to a fourth embodiment is described with reference to FIGS. 15–21.

The method of manufacturing a yoke according to this embodiment has a tube-forming step and a pre-heating step and a painting step in this order, as described in detail below.

The tube-forming step includes a cutting step and a clamping step.

In the cutting step, a belt-like long plate is cut by a press machine or a press cutter into a rectangular sheet to form a plurality of convexities 101 at one side and a plurality of concavities 102 to be fitted to the convexities 101 at the other side. When the convexities 101 are formed at one side, the concavities 102 are automatically formed at the other end.

The one side of the cut sheet (upper side of FIG. 15) has three convexities 101 at the middle thereof, and the other side of the cut sheet (lower side of FIG. 15) has three concavities 102 at the middle thereof.

The three convexities 101 and the three concavities 102 are complementary in shape to each other and located so that they can fit to each other.

The shape of the convexities 101 corresponds to a portion of an ellipse that is cut by a line parallel to the major axis thereof. Each of the convexities 101 has a neck 11 at the base thereof. The shape of the concavities 102 is formed so that the convexities 101 can fit the concavities 102 without gaps.

Figure 16:
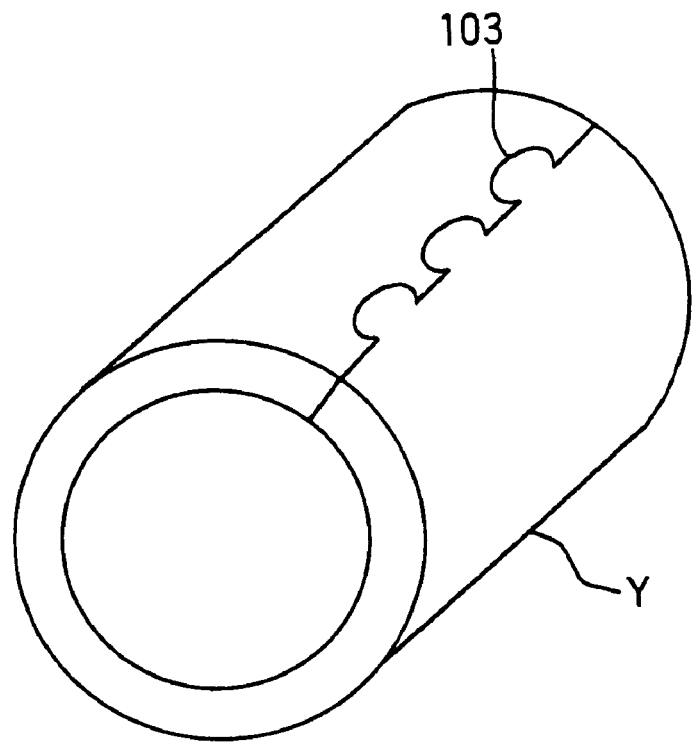
FIG. 16 is a perspective view illustrating a hollow cylindrical yoke according to the fourth embodiment.
Figure 17:
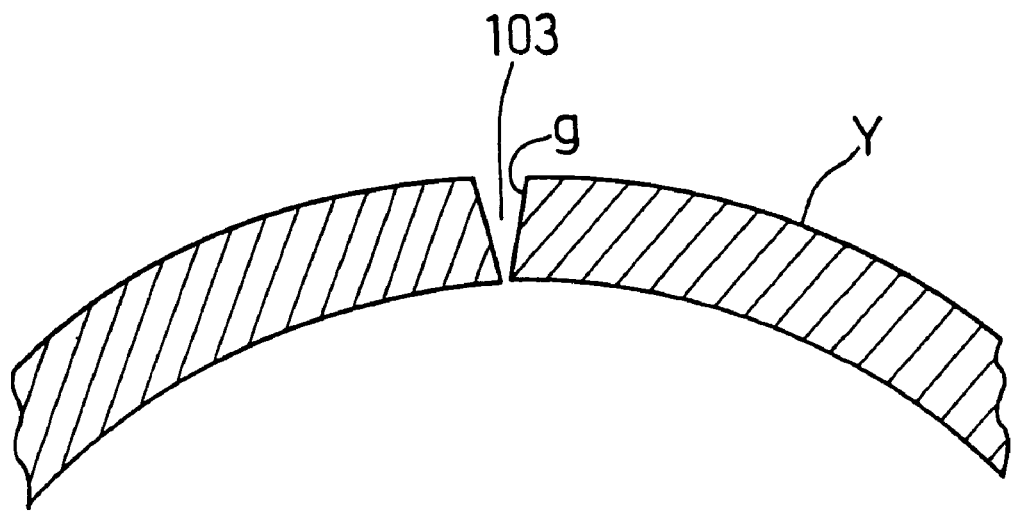
FIG. 17 is a fragmentary cross-sectional view illustrating a portion around a gap of the yoke after a tube-forming step according to the fourth embodiment.

In the fitting step, the cut sheet is rolled up to be cylindrical, and the one side and the other side of the sheet are put together to fit the convexities 101 and the concavities 102 to each other, as shown in FIG. 16.

In the clamping step, the jointed portions 103 of the convexities 101 and the concavities 102 are punched to clamp the one and the other sides of the rolled sheet to each other.

In the preheating step of this embodiment, the yoke Y is heated by a heating apparatus such as an air heating furnace, an infrared lamp, an induction heating apparatus before it is painted.

Figure 18:
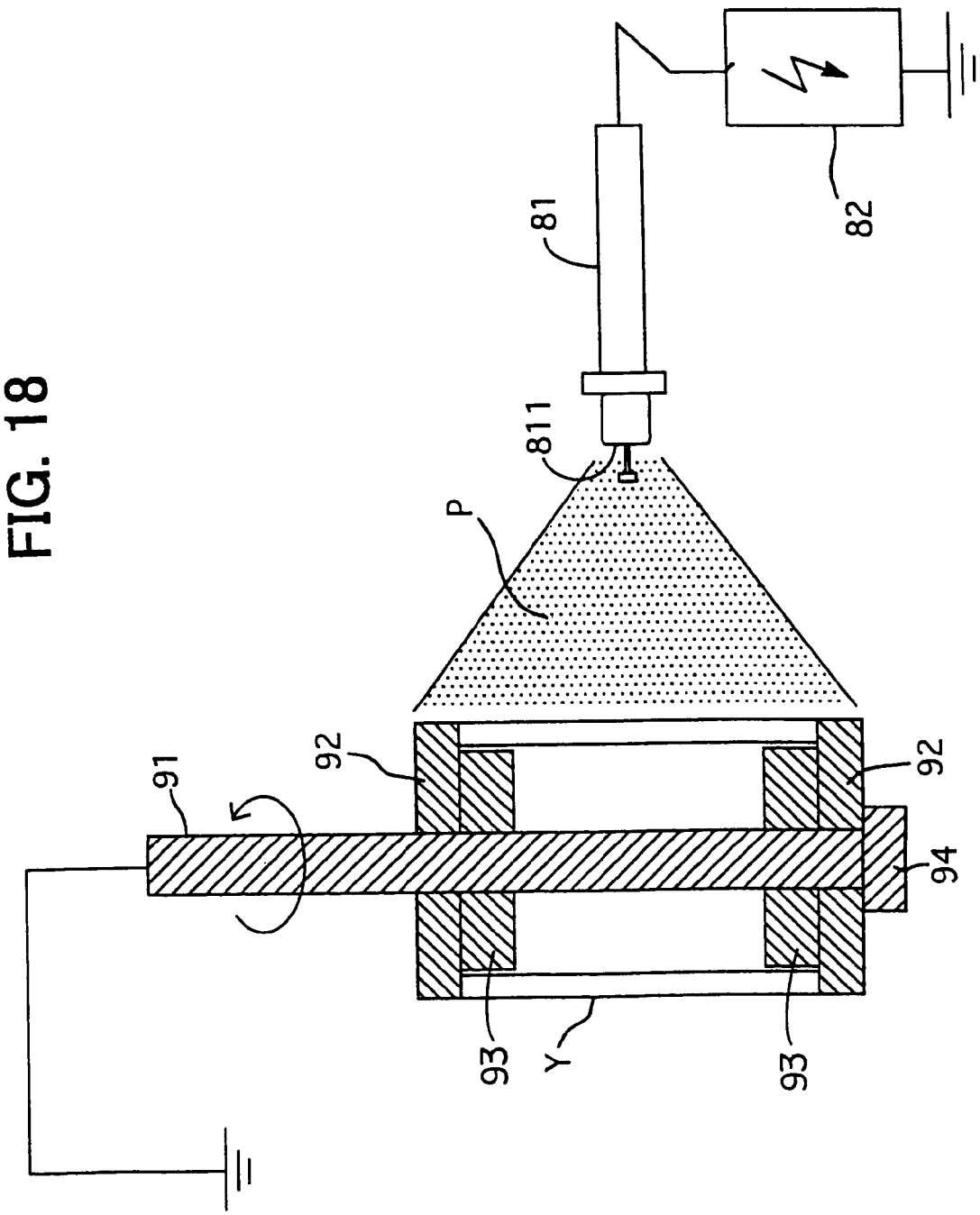
FIG. 18 is a cross-sectional schematic diagram illustrating a holder holding the yoke in a painting step according to the fourth embodiment.
Figure 19:
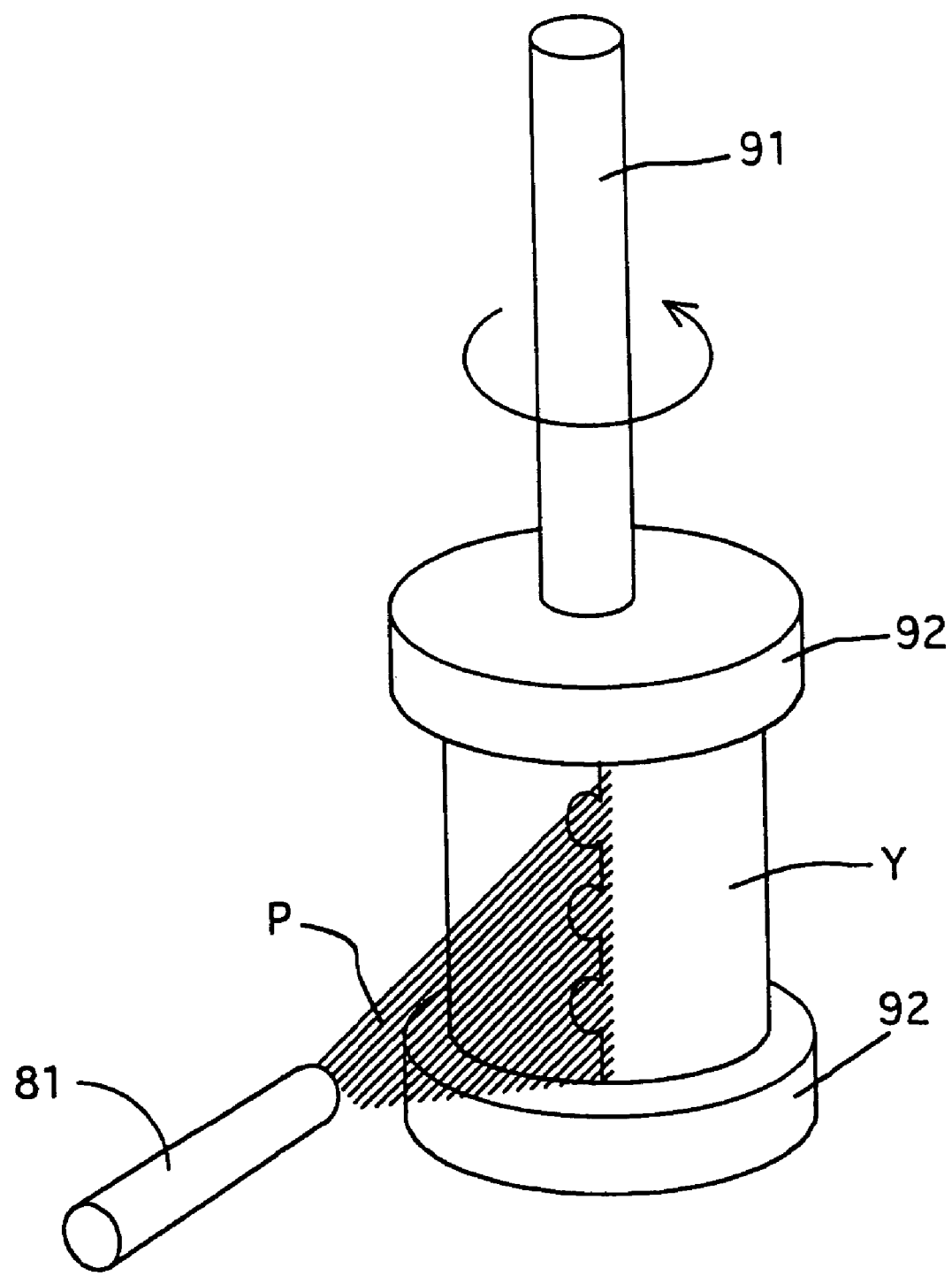
FIG. 19 is a perspective schematic diagram illustrating the painting step according to the fourth embodiment.

In the painting step, the yoke Y formed in the tube-forming step is held by a holder so that the outer periphery of the yoke is electro-statically painted, as shown in FIG. 18.

The holder is comprised of a shaft 91, a pair of masking disks 92 that has an outside diameter larger than the outside diameter of the yoke Y, a pair of support members 93 that has an approximately the same outside diameter as the inside diameter of the cylindrical member Y and a fastening member 94 for fixing the masking disks 92 and the yoke Y to the shaft 91. The pair of masking disks 92 is electrically connected to the yoke Y and is disposed to mask the opposite axial ends of the yoke Y. The shaft 91 extends through the center of the masking disks 92 and is rotatably supported by a rotary device (not shown). The shaft 91 and the pair of masking disks 92 are electrically connected to each other when the yoke Y is held by the holder. Therefore, the yoke Y is electrically connected to the shaft 91 while it is sandwiched by the pair of masking disks 92 at the opposite ends thereof.

The electro-static painting is carried out by an electro-static painting gun. The electro-static painting gun includes a gun body 81 that has an injection nozzle 811 for injecting electrically charged paint powder P and an electric power unit 82 for supplying electric power to the gun body 81. The injection nozzle 811 injects paint powder straight. A negative electrode of the power unit 82 is connected to the gun body 81, and the positive electrode of the power unit 82 is grounded.

The electro-static painting is carried out while rotating the shaft 91 of the holder to rotate the yoke Y after the holder for holding the yoke Y is grounded. The injection nozzle 811 of the electro-static painting gun is located to inject the paint powder P toward the cylindrical axis of the yoke Y. The electro-static painting is started from the portion just in front of the jointed portion 103 around the whole outer periphery of the yoke Y and ended at the same portion of the jointed portion 103, as shown in FIG. 5. The quantity of the paint is controlled so that the thickness of the paint film that is stuck on the outer periphery of the yoke Y is less than twice as thick as the gap g.

Figure 20:
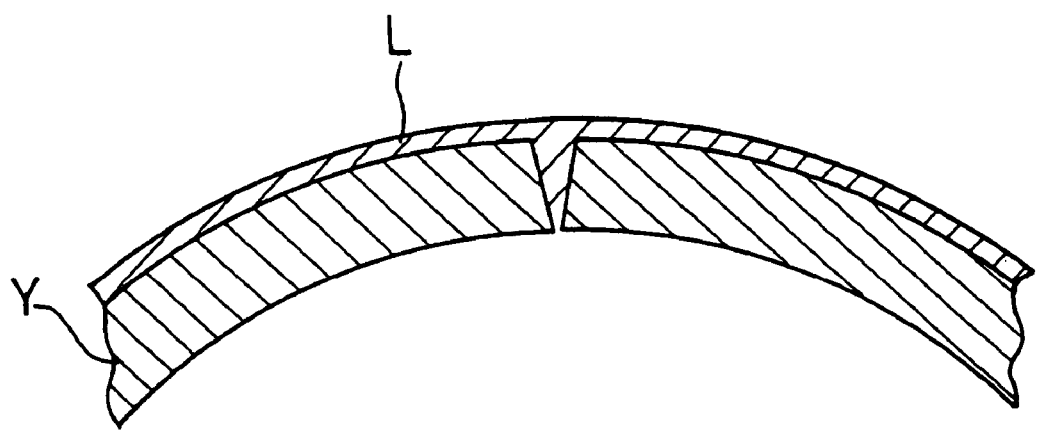
FIG. 20 is a fragmentary cross-sectional view of the yoke manufactured by the method according to the fourth embodiment.

Thus, the paint film L is formed on the yoke Y at the jointed portion 103 so that the yoke Y has a hermetic seal, as shown in FIG. 20.

In the tube-forming step, when the convexities 101 are formed at a side of a sheet by a press cutter, the concavities 102 are automatically formed. Therefore, the yield rate of the yoke material is high and the material cost can be reduced.

Figure 21:
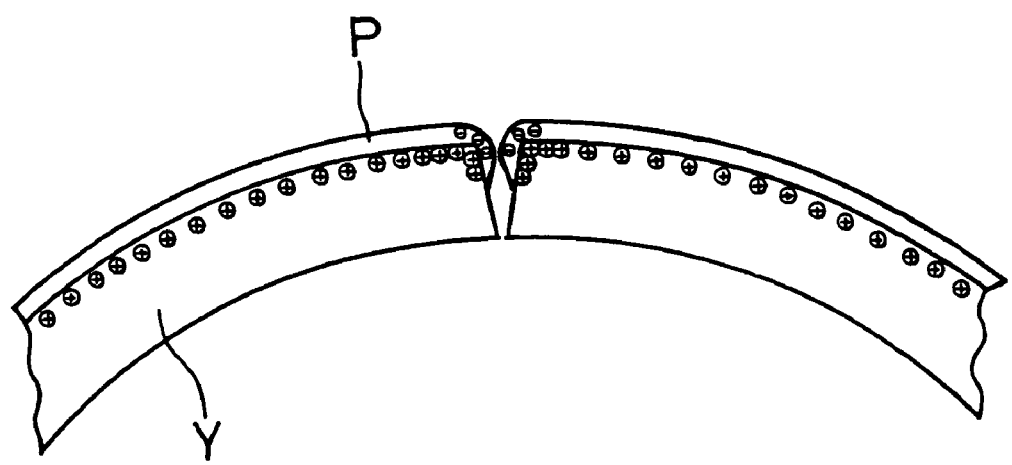
FIG. 21 is a fragmentary cross-sectional view illustrating a portion of the yoke with paint powder sticking thereto.

In the painting step, since electric charges gather at corners of the gap g of the yoke Y, the paint powder P concentrates at and sticks to the portion around the gap so that the gap g can be fully closed by the paint powder P, as shown in FIG. 21. In the painting step, since the yoke Y is preheated in the preheating step, the paint powder can well stick to the outer periphery of the yoke, so that the exterior of the yoke can be improved.

As a variation 1 of the fourth embodiment, the holder used in the painting step is formed from insulation material as a masking member 92' to electrically insulate the yoke Y from a shaft 91', as shown in FIG. 22. The electrical connection of the shaft 91' and the yoke Y is made by a conductive support 93'c that is fixed and electrically connected to the shaft 91' and abutted against the inner periphery of the yoke Y. Since an electric potential is not applied to the masking member 92', paint powder does not stick to the masking member 92'.

Figure 23A:
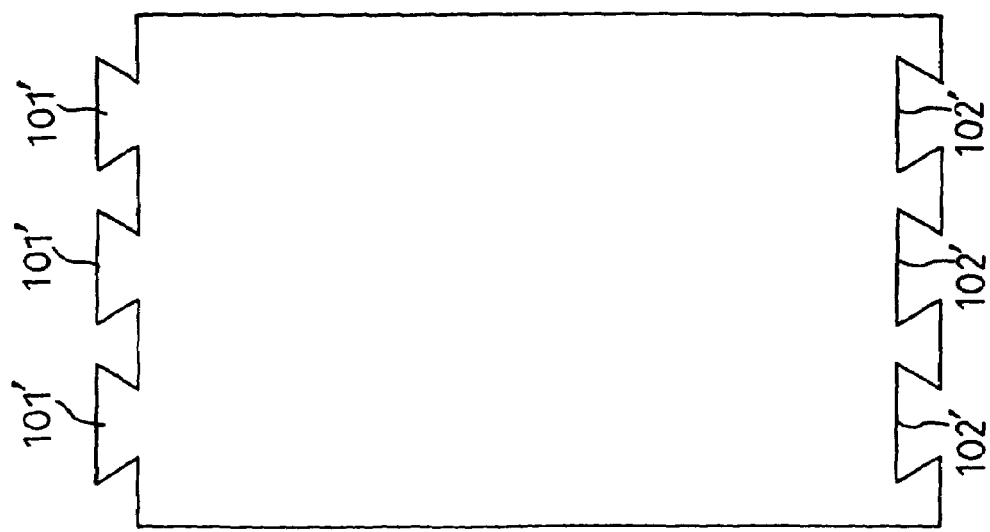
FIG. 23A is a plan view of a cut steel sheet for forming a yoke.
Figure 23B:
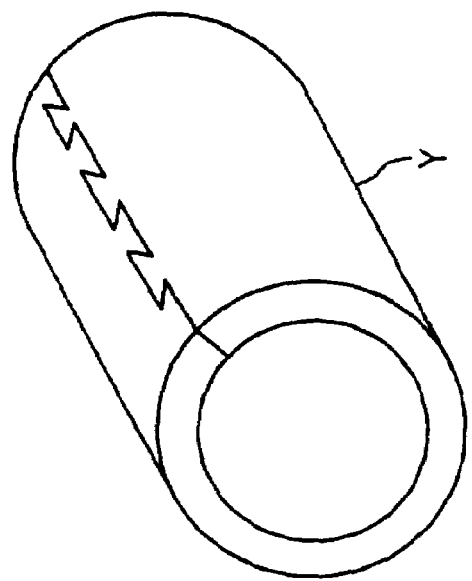
FIG. 23B is a perspective view illustrating a yoke manufactured by a method according to a variation 2 of the fourth embodiment.

As a variation 2 of the fourth embodiment, the shape of each of the convexities 101' is an isosceles trapezoid, as shown in FIGS. 23A and 23B. Since the convexities 101' and the concavities 102' are profiled by straight lines, it is easy to cut those from a plate.

A method of manufacturing a yoke according to a fifth embodiment of the invention is described with reference to FIGS. 24A and 24B–FIG. 27.

A yoke Y is used in a starter motor of a vehicle starter. As shown in FIG. 25, a bracket B is fitted to the inner periphery of the yoke Y.

Figure 24A:
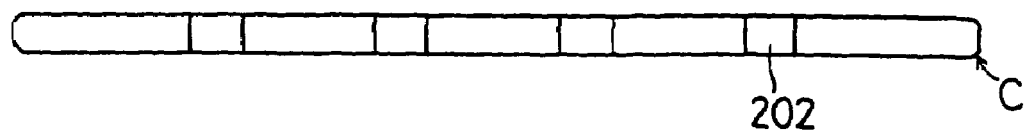
FIG. 24A is a side view of a cut steel plate for a fifth embodiment of the invention.
Figure 24B:
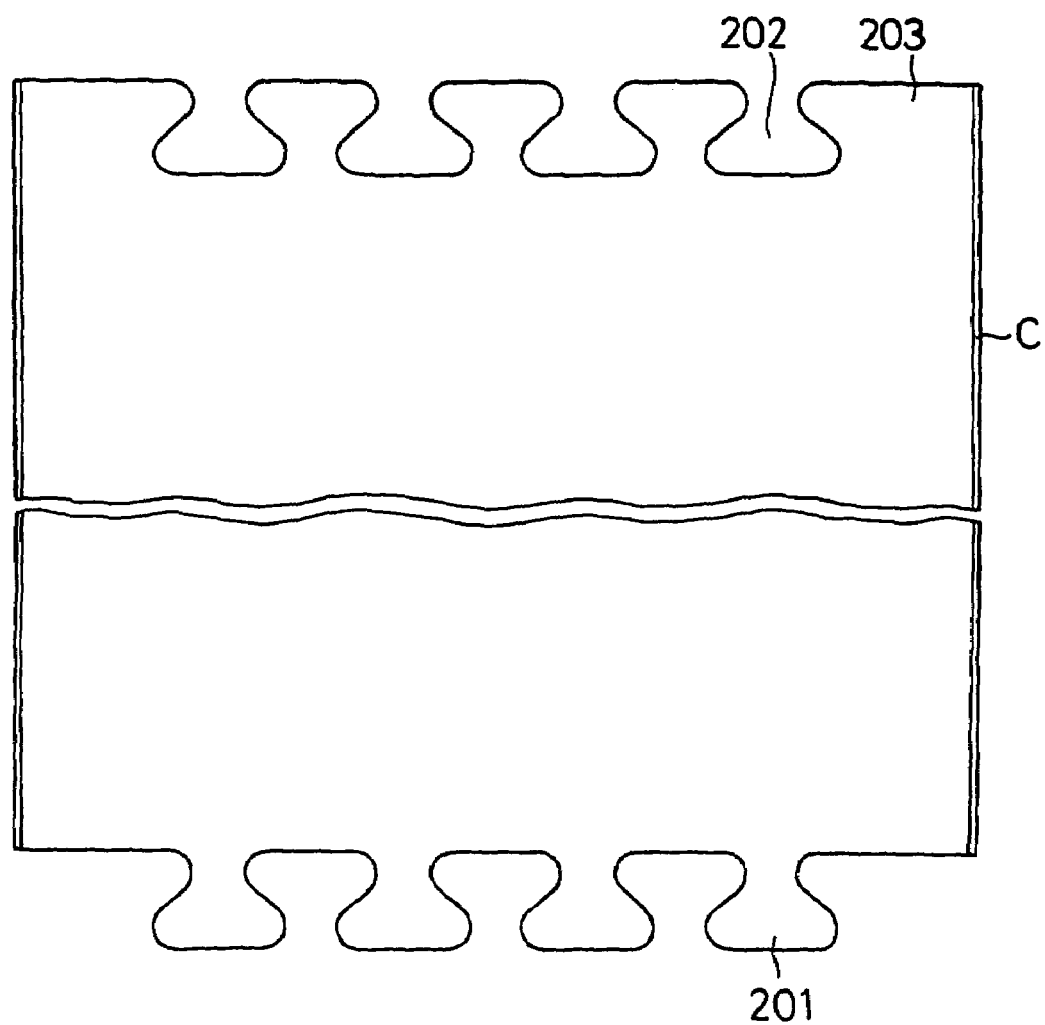
FIG. 24B is a plan view thereof.

The yoke Y is manufactured by rolling up the longitudinal sides (upper and lower sides) of the steel plate shown in FIGS. 24A and 24B to form a cylindrical shape.

The steel plate is formed from a sheet material (not shown), which is cut into a rectangle having a fixed width by a press machine. As shown in FIG. 24A, a plurality of convexities (dovetail convexities) 201 is formed on one of the longitudinal sides, and a plurality of concavities 202 is formed on the other side. The convexities 201 and the concavities 202 are fitted to each other, as shown in FIG. 26A, after the steel plate is rolled up into a cylindrical yoke.

Chamfered corner C (for example, the slope of the corner is about 45 degree) is formed at a corner of the steel plate in the width direction (right corner and/or left corner) before it is rolled up, as shown in FIG. 24B. The chamfered corner C is formed by a press machine at the inside corner of the yoke where the bracket B is fitted. In other words, the steel plate is rolled up so that the chamfered corner C can be located at the inside of the yoke Y in the thickness direction thereof, as shown in FIG. 26B.

Therefore, it is not necessary to cut such a chamfered corner C by an additional machine work, so that the manufacturing cost can be reduced. Especially, it is easy to form a chamfered corner by pressing before the steel plate is rolled up. The chamfered corner can be formed concurrently when the steel plate is cut by a press machine.

The bracket B can be fitted to the outside of the yoke Y, as shown in FIG. 27. In this case, the chamfered corner should be formed at the outside corner of the yoke Y. The steel plate can be formed from a long belt-like material having a fixed width by separating the portions of the convexities 201 and concavities 202.

A method of manufacturing a yoke according to a sixth embodiment of the invention is described with reference to FIGS. 28A and 28B. The shear drop 204 is formed on the outside of the yoke Y by cutting the steel plate by a press machine at opposite sides in the width direction. In this case, the shear drop 204 is formed at the upper side of the cut portion, and a cut surface 205 is formed next to the shear drop.

If the shear drop 204 is located inside the yoke Y, as shown in FIG. 29A, the shear drop can be utilized as a chamfered corner of the yoke Y into which the bracket B is fitted, as shown in FIG. 25. If the steel plate is rolled up so that the cut surface 205 can be located at the outside of the yoke Y, the cut surface 205 is expanded in the circumferential direction to help the cut surface 205 crack.

In this embodiment, the cut surface 205 is located at the inside of the yoke Y so that the chamfered corner C can be formed at the cut surface, as shown in FIG. 26B.

If the bracket B is fitted to the outside of the yoke Y, the chamfered corner C should be formed at the outside of the yoke Y.

The chamfered slope is not limited to 45 degree. It may be 30, 60 or any other degree. The chamfered slope may be round R.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A method of manufacturing a yoke comprising the steps of:
   cutting a steel plate into a sheet having a plurality of convexities at a first side, a plurality of concavities at a second side that is opposite the first side, and a chamfered axial end having a bevel where a corner of the plate was removed;
   rolling said sheet to form a cylindrical shape;
   fitting said convexities and said concavities; and
   clamping said convexities and said concavities by pressing the same.

2. The method of manufacturing a yoke according to claim 1, wherein said bevel is formed by pressing.

3. The method of manufacturing a yoke according to claim 1, wherein
   said step of cutting comprises a step of forming a shear drop at said axial end, and
   said step of rolling comprises a step of locating said shear drop outside said cylindrical shape.

4. The method of manufacturing a yoke according to claim 1, wherein
   said step of cutting comprises a step of forming a shear drop at said axial end, and
   said step of rolling comprises a step of locating said shear drop inside said cylindrical shape.

5. The method of manufacturing a yoke according to claim 1, wherein the bevel extends continuously along an entirety of the chamfered axial end.

6. The method of manufacturing a yoke according to claim 5, wherein the sheet is rolled so that the bevel is located on an inside portion of the cylindrical shape.

7. The method of manufacturing a yoke according to claim 5, wherein the sheet is rolled so that the bevel is located on an outside portion of the cylindrical shape.

8. The method of manufacturing a yoke according to claim 1, wherein the sheet is rolled so that the bevel is located on an inside portion of the cylindrical shape.

9. The method of manufacturing a yoke according to claim 1, wherein the sheet is rolled so that the bevel is located on an outside portion of the cylindrical shape.

* * * * *